Jan. 21, 1969  C. N. CHRISTIAN  3,423,708
MAGNETIC HOLDER FOR POTS AND PANS
Filed Feb. 20, 1967
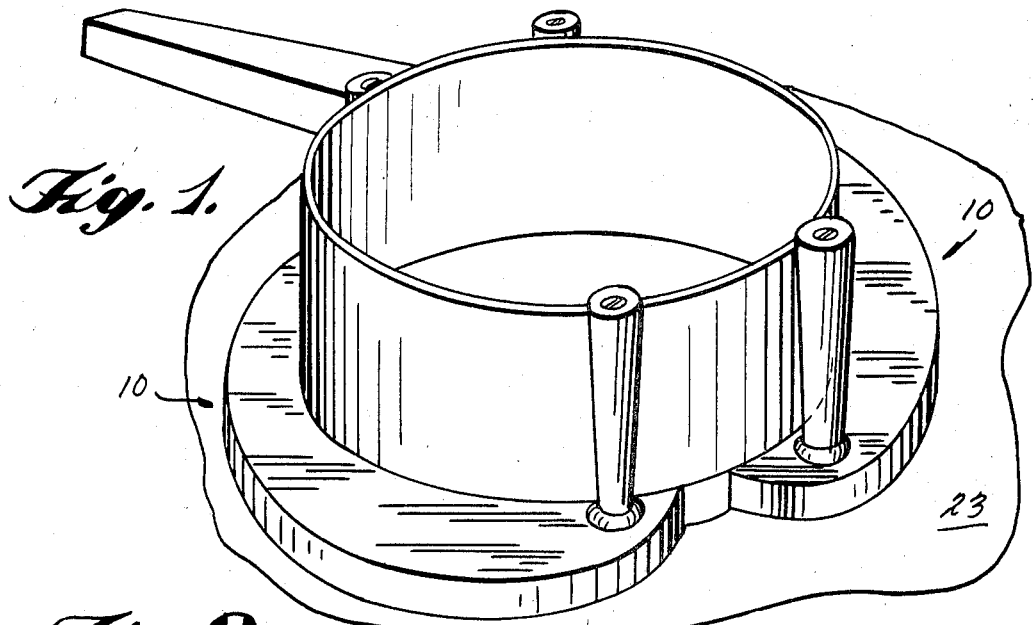
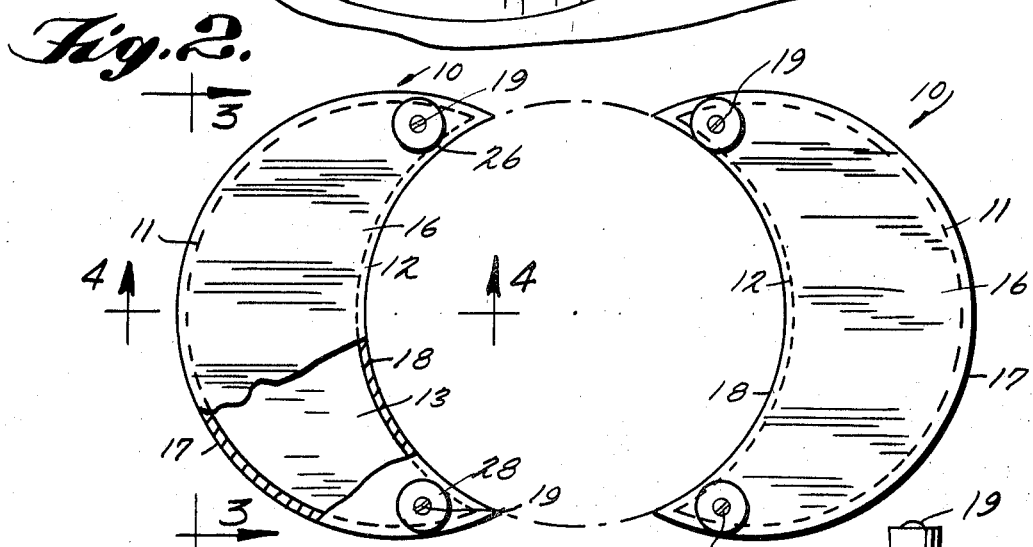
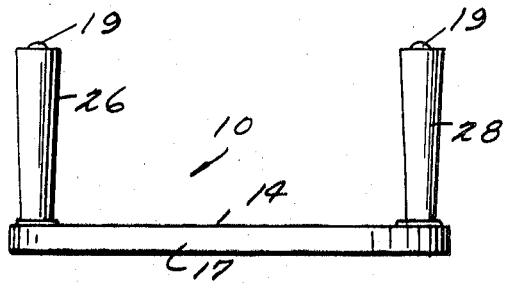
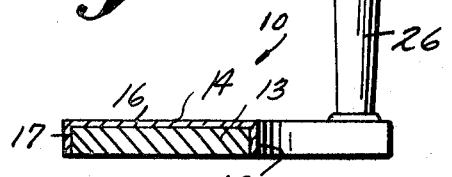
INVENTOR.
CLARENCE N. CHRISTIAN
BY
Cushman, Darby & Cushman
ATTORNEYS

United States Patent Office 3,423,708
Patented Jan. 21, 1969

3,423,708
MAGNETIC HOLDER FOR POTS AND PANS
Clarence N. Christian, 303 N. Bethel St.,
Olympia, Wash. 98501
Filed Feb. 20, 1967, Ser. No. 617,130
U.S. Cl. 335—285           1 Claim
Int. Cl. H01f 7/20

ABSTRACT OF THE DISCLOSURE

A crescent-shaped magnetic sheet for holding pots and pans on a stove wherein one of the sheets is placed on each side of the pot or pan with the concave edge of the device facing inwardly so as to engage the periphery of the pot or pan.

---

This invention relates generally to a pot and pan holder and more particularly to a magnetic holder which securely maintains pots, pan and similar cooking utensils in any desired position on the upper surface of a stove or any other metallic supporting susface to which a magnet will adhere.

Briefly, the invention comprises a crescent-shaped magnet sheet which is provided with a superimposed similarly shaped cover sheet and a pair of fireproof handles.

Since the magnetic sheet is employed to anchor the holder to the surface of the stove while the pot or pan is held in position by the concave edge of the holder, it will be seen that the utility of the present invention is not limited to cooking utensils made from iron or steel but that the holder can function equally as well when used with cooking utensils made from other materials.

The magnetic holder of the present invention can be easily positioned on a stove or similar metallic surface and provides an inexpensive, convenient means for maintaining pots and pans on a galley stove during rough weather.

Further applicant's holders can be readily repositioned if it is desired to move the utensil or to accommodate utensils of various sizes.

Other objects and advantages of the present invention will become more apparent from the following description when taken in combination with the accompanying drawing in which:

FIGURE 1 is a perspective view of the invention illustrating the manner in which the holders are used;
FIGURE 2 is a plan view of two holders;
FIGURE 3 is an elevation of a holder along line 3—3 of FIGURE 2; and
FIGURE 4 is a section along line 4—4 of FIGURE 2.

The magnetic holder generally indicated by reference character 10, is crescent-shaped having a convex edge 11 and a concave edge 12. Although it is contemplated that the size of the holder can be varied as desired, in the preferred embodiment, the magnetic holder is one-half an inch in thickness and as viewed along lines 3—3, 4—4 of FIGURE 2 and shown in FIGURES 3 and 4 respectively is seven inches in length by three inches in width. Further, in the preferred embodiment, the radius of the arc defined by the convex edge 11 is equal to the radius of the arc defined by the concave edge 12 which permits the nesting of one holder within another holder when the holders are not in use.

The magnetic sheet 13 as shown in FIGURES 2 and 4 is covered by a thin sheet of stainless steel 16 or other similar material which is fastened to the magnetic sheet by a suitable fastening means such as screws 19. Sheet 16 is crescent-shaped and is substantially the same size as magnetic sheet 13. Further, the sheet 16 not only covers the upper surface 14 of the magnetic sheet 13 but is also provided with downturned edge portions 17 and 18 which cover edges 11 and 12 of the magnetic sheet. The cover sheet 16 not only improves the general appearance and cleanliness of the magnetic holder 10, it also provides protection for the magnetic sheet 13.

Though it is contemplated that other types of handles could be utilized in the preferred embodiment, elongated frusto-conical handles 26 and 28 are located on the holder 10 adjacent the outer ends of the holder where the convex and concave edges 11 and 12 of holder intersect. The handles are made of a fireproof material such as aluminum, steel or other similar materials and are fastened to the cover sheet 16 and magnetic sheet 13 by means of suitable fasteners such as screws 19. Any heat which is conducted through cover sheet 16 is dissipated before it reaches the handles 26 and 28 which are thus kept in a relatively cool condition so as to permit handling.

In operation, a pot or a pan, which may be constructed from iron, steel, stainless steel, aluminum, glass, crockery or other such materials, is maintained in any desired position on the upper surface of a stove or similar supporting surface having an iron or steel face 23 by two magnetic holders 10 which adhere to the surface. The magnetic holders are placed opposite each other with the concave edges engaging the periphery of the pot or pan, thereby preventing movement of the pot or pan. Although the holders 10 of the present invention have been mainly described in connection with their use on galley stoves, they are equally well adapted for use on any metallic surface where one wishes to keep a pot, pan or similar cooking utensil from moving.

While the preferred form of the invention has been shown and described, it is to be understood that all suitable modifications and equivalents may be resorted to which fall within the scope of the invention as claimed.

I claim:
1. A magnetic holder for cooking utensils comprising:
a crescent-shaped magnetic sheet, said magnetic sheeting having a convex edge, said magnetic sheet having a concave edge for engaging the periphery of a cooking utensil, and the radius of the arc defined by said concave edge being at least equal to the radius of the arc defined by said convex edge so as to permit nesting of one holder within another holder when said holders are not in use;
a thin sheet of stainless steel overlaying said magnetic sheet and attached to said magnetic sheet; and
two fireproof handles extending upward from and attached to said sheet of stainless steel and said magnetic sheet.

References Cited
UNITED STATES PATENTS
425,768   4/1890   Ezell.
2,723,875  11/1955  Russell _____ 335—285 XR
2,761,717  9/1956   Mahlke _____ 335—285 XR GEORGE HARRIS, *Primary Examiner.*

U.S. Cl. X.R.
335—302; 126—24